J. G. VINCENT.
CONTROL MECHANISM FOR MOTOR VEHICLES.
APPLICATION FILED MAY 1, 1915.
1,321,164. Patented Nov. 11, 1919.
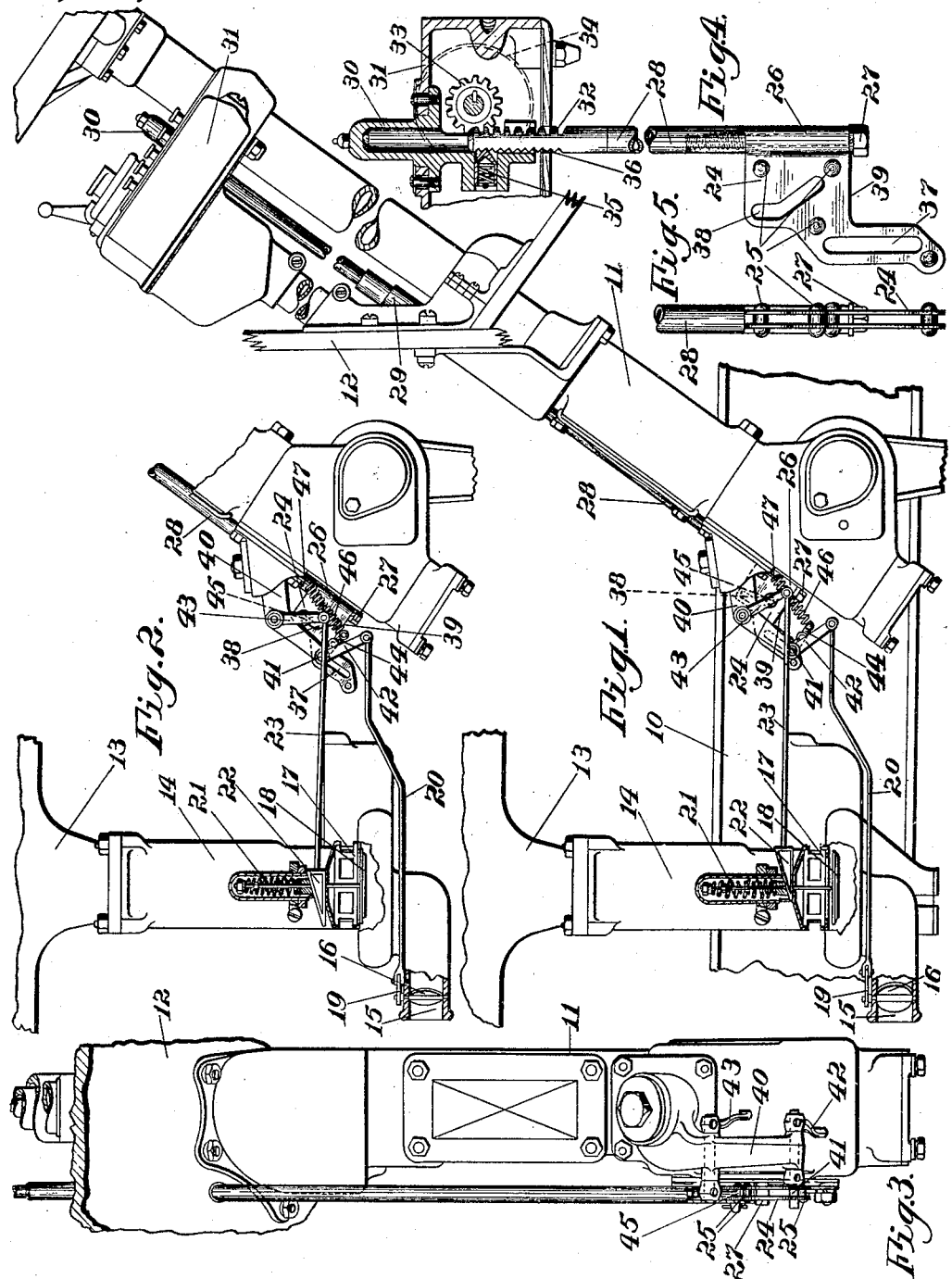
Witnesses:
Clair J. Cote
Le Roi J. Williams
Inventor:
Jesse G. Vincent
By Milton Sikkels
Attorney

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CONTROL MECHANISM FOR MOTOR-VEHICLES.

1,321,164.        Specification of Letters Patent.      Patented Nov. 11, 1919.

Application filed May 1, 1915. Serial No. 25,272.

*To all whom it may concern:*

Be it known that I, JESSE G. VINCENT, a citizen of the United States, and resident of Detroit, Wayne county, State of Michigan, have invented certain new and useful Improvements in Control Mechanism for Motor-Vehicles, of which the following is a specification.

This invention relates to motor vehicles and particularly to means for controlling the carbureter valve.

One of the objects of the invention is to provide a mechanism that may be cheaply manufactured and easily assembled and yet one that is effective in operation. Other objects will appear from the following description taken in connection with the drawings which form a part of this specification, and in which—

Figure 1 is a side elevation of parts of a motor vehicle, including the steering column and carbureter and connecting devices, involving this invention.

Fig. 2 is a view similar to Fig. 1 with the upper part of the supporting column omitted and with the control mechanism in a different position.

Fig. 3 is a front elevation of the steering or supporting column.

Fig. 4 is a detailed view of the operating rod and cam and

Fig. 5 is an end view of the cam.

Referring to the drawings, 10 represents part of a motor vehicle frame, upon which the steering column 11 and the dash 12 are supported. The vehicle motor is also supported upon this frame in the usual manner and the intake pipe 13 of the motor is shown in Figs. 1 and 2. The motor carbureter 14 is supported from the intake pipe 13 and is provided with a main air intake passage 15 controlled by a butterfly valve 16 and an auxiliary air passage 17 controlled by a spring operated puppet valve 18. As shown in Figs. 1 and 2, the butterfly valve 16 may be moved from its open and closed positions by the arm 19 and rearwardly extending rod 20, and the tension of the springs 21 of the valve 18 may be regulated by a wedge 22 operated by a rearwardly extending rod 23. These rods 20 and 23 form connections from the carbureter valves to a cam device mounted at the lower end of the supporting column 11. This cam device is shown at 24 in Fig. 4 and is preferably formed of a steel stamping bent upon itself to form two identical plate cams which are slightly separated and secured in separated position by several rivets 25. At the bend in the stamping it is slightly enlarged as shown at 26 and a bolt 27 passes through this portion of the cam adjacent two of the rivets 25 and into the end of an operating rod 28. Thus the cam 24 is rigidly secured to the lower end of the operating rod. This rod is adapted to reciprocate in a bearing 29 between the ends of the rod and a bearing 30 in a bracket 31 mounted at the upper end of the supporting column 11. Teeth 32 are formed in the upper end of the operating rod 28 and a pinion 33 operated by a hand wheel 34 mounted also in the bracket 31, meshes with the teeth 32 and permits manual reciprocation of the operating rod 28. A spring pawl 35 operating in notches 36 in the upper end of the rod 28 holds the latter yieldingly in adjusted position.

The cam device 24 is formed with a guide slot 37, a cam slot 38, and a cam surface 39. A bracket 40 is mounted upon the supporting column 11 adjacent its lower end and a pin 41 on this bracket 40 operates in the guide slot 37 and thereby supports and guides the cam 24 and the lower end of the operating rod 28. Also mounted on the bracket 40 are arms or levers 42 and 43 the arm 42 being connected to the rod 20 and the arm 43 being connected to the rod 23. The lever 42 is shown in the form of a bell crank having a part 44 arranged in the path of travel of the cam surface 39 hereinabove referred to. The lever 43 is also a bell crank and has a pin 45 adapted to operate in the cam slot 38.

A retracting spring 46 is secured at one end to the bell crank lever 42 and at the other end to the supporting column 11 at 47, for the purpose of maintaining the butterfly valve 16 in open position except when it is positively moved to closed position by means of the cam surface 39 contacting with and moving the part 44 of the bell crank lever 42.

It will be seen that in Fig. 1 the cam 24 is in its uppermost position and the pin 45 therefore is in the lowest part of the cam slot 38. As the cam 24 is moved downwardly, the inclined portion of the cam slot 38 causes the lever 43 to oscillate and thereby move the connecting rod 23 and the wedge 22 so that the springs 21 of the auxiliary air valve 18 are compressed or tightened. As soon as the cam has moved a sufficient distance for the pin 45 to enter the upper or straight portion of the slot 38, the cam surface 39 comes in contact with the portion 44 of the bell crank lever 42, and the further movement of the cam 24 operates to close the butterfly valve 16 in the main air intake 15 of the carbureter. During this latter movement of the cam 24, the pin 45 operates in the straight portion of the cam slot 38 and thereby holds the wedge 22 in its innermost position. The reverse movement of the cam 24 of course operates the parts in reverse order.

From the above, it is evident that the operating rod 28 may be manually reciprocated by the hand wheel 34, and the downward movement of the rod carries with it the cam 24, which thereupon operates the carbureter air valve connections *seriatim*.

Having thus described my invention, what I claim and desire to secure by Letters Patent is:—

1. In a motor vehicle, the combination with a supporting column and a plurality of carbureter valves, of a control rod mounted on the column for manual operation, connections from the valves to the column, and cam devices on said rod for operating said connections *seriatim*.

2. In a motor vehicle, the combination with a supporting column, and a plurality of carbureter valves, of a cam slidable upon said column, levers mounted on said column and operated by said cam, and connections from said levers to the carbureter valves.

3. In a motor vehicle, the combination with a supporting column, and a plurality of carbureter valves, of a bracket at the lower end of said column, a cam and levers mounted on said bracket, means for manually operating the cam, and connections from said levers to the carbureter valves.

4. In a motor vehicle, the combination with a supporting column and main and auxiliary air intake valves for a carbureter, a control rod mounted on the column for manual operation, connections from the valves to the column and cam devices on said rod for operating the connection to said auxiliary intake valve and then the connection to said main intake valve.

5. In a motor vehicle, the combination with a supporting column, a plurality of air intake valves for a carbureter, a control device mounted on said supporting column, a cam on said device, said cam having a cam slot and a cam surface, links on said column oscillated by said cam slot and cam surface and connections from said valves to said links.

6. In a motor vehicle, the combination with a supporting column, main and auxiliary air intake valves for a carbureter, a control device mounted on said supporting column, a cam on said device, said cam having a cam slot and a cam surface, arms on said column oscillated by said cam slot and cam surface and connections from said main valve to the arm oscillated by said cam slot and from said auxiliary valve to the arm oscillated by said cam surface.

In testimony whereof I affix my signature in the presence of two witnesses.

JESSE G. VINCENT.

Witnesses:
 LE ROI J. WILLIAMS,
 CLAIR J. COTE.

Copies of this patent may be obtained for five cents each, by addressing the "Commissioner of Patents, Washington, D. C."